INVENTORS
Heinz Georg Karl
Börje Mats Ingvar Roos
BY
Hane and Nydick
Attorneys

INVENTORS
Heinz Georg Karl
Börje Mats Ingvar Roos
BY
Hane and Nydick
Attorneys

United States Patent Office 3,469,212

Patented Sept. 23, 1969

3,469,212

MODULATOR EMPLOYING A PAIR OF TRANSISTORS BIASED FOR CLASS AB OPERATION

Heinz Georg Karl, Trangsund, and Börje Mats Ingvar Roos, Stockholm, Sweden, assignors to Telefonaktiebolaget L M Ericsson, Stockholm, Sweden, a corporation of Sweden Filed Oct. 31, 1966, Ser. No. 590,983
Claims priority, application Sweden, Nov. 23, 1965, 15,094/65
Int. Cl. H03c 1/36
U.S. Cl. 332—31 2 Claims

ABSTRACT OF THE DISCLOSURE

A modulator includes a pair of transistors whose bases are connected to the arms of a centertapped secondary winding of an input transformer which receives the modulating signals across its primary winding. The collectors of the transistors are connected to the arms of a centertapped primary winding of an output transformer whose secondary winding transmits modulated signals. The emitters of the transistors are interconnected by a centertapped resistor. A source of operating voltage is connected between the centertap of the resistor and the centertap of the primary winding of the output transformer. A voltage divider is connected across the operating voltage source with the output of the voltage divider connected to the centertap of the secondary winding of the input transformer to bias the base electrodes to class AB operation. The carrier signal is applied between the centertap of the secondary winding of the input transformer and a terminal of the source of operating voltage.

Figure 1:
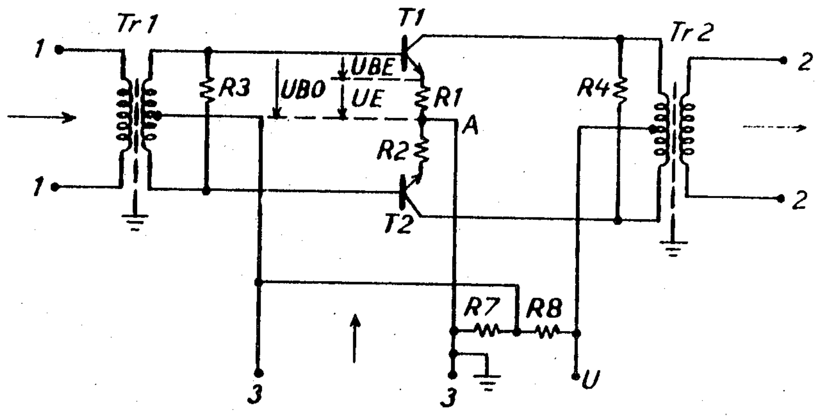

The present invention refers to an arrangement for modulators comprising at least one pair of transistors which are connected in parallel for the carrier voltage and in push-pull for the signal voltage. The pair of transistors have their emitter electrodes connected by means of a resistance provided with a first tap, and their base electrodes connected by means of a winding on a first transformer, provided with a second tap. The signal voltage is applied to the modulator via the transformer and the carrier voltage is applied to the modulator via the first and second collector taps. The electrodes of the transistor are connected by means of a second transformer provided with a third tap, through which second transformer the modulated signal voltage is derived from the modulator. A direct voltage supply is applied to the modulator via the first and third taps.

In transistor modulators difficulties often arise with the frequency transposition of signal voltages if the amplitude of the voltages shall not become dependent on amplitude variations in the carrier voltage source. At very high frequencies the output signal becomes directly dependent on the amplitude of the carrier voltage source. In hitherto known solutions of this problem different methods have been used. One method is to use an amplifier connected between the carrier voltage source and the modulator which amplifier contains regulating circuits, so that a constant carrier voltage is always supplied to the modulator. Another method is to use a carrier generator to the output of which has been connected a diode limiter. A square wave is obtained from this diode limiter which is then filtered in a low pass filter. The signal obtained from the low pass filter, which signal is supplied to the modulator, will, accordingly be less dependent on variations in the carrier voltage.

A modulator of the type indicated above is usually so designed that the transistors work in class B-operation. Thus during the positive half-period of the carrier voltage the transistors become conductive. The collector current obtained then consists of a train of pulses of the same height. When the signal voltage is connected to the modulator the pulse height will thus vary in step with the frequency of the signal voltage. A modulator connection of the indicated type now demands a rather high carrier power in order that the transistors should be conducting. This power is dependent on the size of the resistance that interconnect the emitter electrodes of the transistors. Then however the risk will arise that the carrier voltage becomes too high. The base emitter diode in the transistors must have a larger permitted blocking voltage than the applied negative half-wave of the carrier voltage. Furthermore the base current is directly dependent on the amplitude of the carrier voltage and therefore also the output voltage will be affected by the variations of the carrier voltage. Furthermore there is needed, in order to adapt the carrier signal input to the impedance of the source of the carrier voltage, for example 75 ohms, a transformer or an impedance transforming link. Already at a frequency of 5 or 6 mHz. problems will arise in designing such impedance matching links in practice.

An object of this invention is to avoid the disadvantages mentioned above; variations in the amplitude of the carrier voltage, high necessary carrier power and difficulties in matching to the carrier source. An arrangement according to the invention is thus mainly characterized by the direct voltage supply of the modulator being provided with a voltage divider which is connected to the base electrodes of the transistors, the voltage divider being so arranged that the transistors are given such a base bias that they work in class AB-operation.

Figure 3:
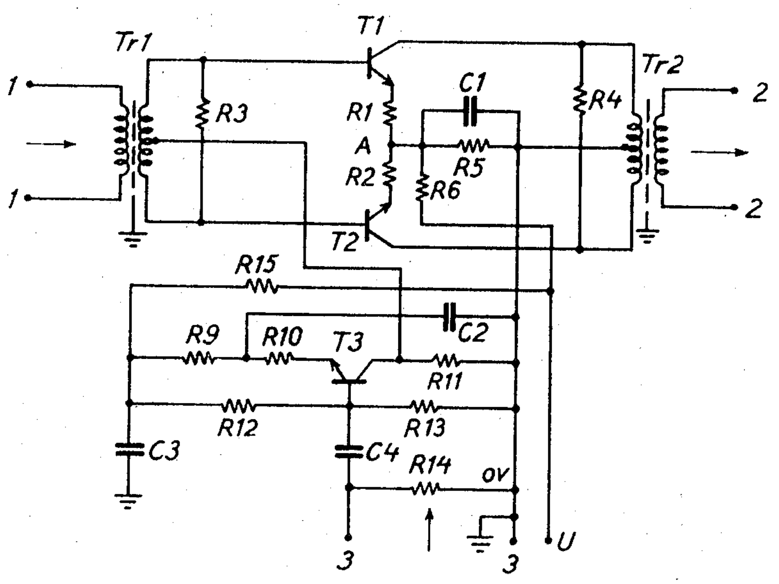

The invention will be described more in detail in connection with the accompanying drawings, where FIG. 1 shows an arrangement in principle according to the invention, FIG. 3 shows the base current as a function of the base-emitter-voltage and FIG. 3 shows a practical embodiment in accordance with the invention.

FIG. 1 shows a modulator circuit comprising the transistors T1 and T2 which are connected to an input transformer Tr1 and to an output transformer Tr2. To the input transformer Tr1 the signal voltage is supplied through the terminals 1, 1 and from the output transformer Tr2 the modulated signal will be derived through the terminals 2, 2. Parallelly to the second winding of the transformer Tr1 a resistance R3 is connected and parallelly to the primary winding of the transformer Tr2 a resistance R4 is connected. The emitter electrodes of the transistors T1 and T2 are connected by means of two series connected resistances R1 and R2. Between the connecting point A of these resistances and a centre tap on the secondary winding of the input transformer the carrier signal is supplied to the modulator through the terminals 3, 3. Between the same connecting point A and a centre tap on the primary winding of the output transformer direct voltage will be supplied to the transistors from a direct current source U. Through this voltage source is arranged a voltage divider consisting of the resistances R7 and R8. The connecting point of these resistances is conducted to the centre tap on the secondary winding of the input transformer.

Figure 2:
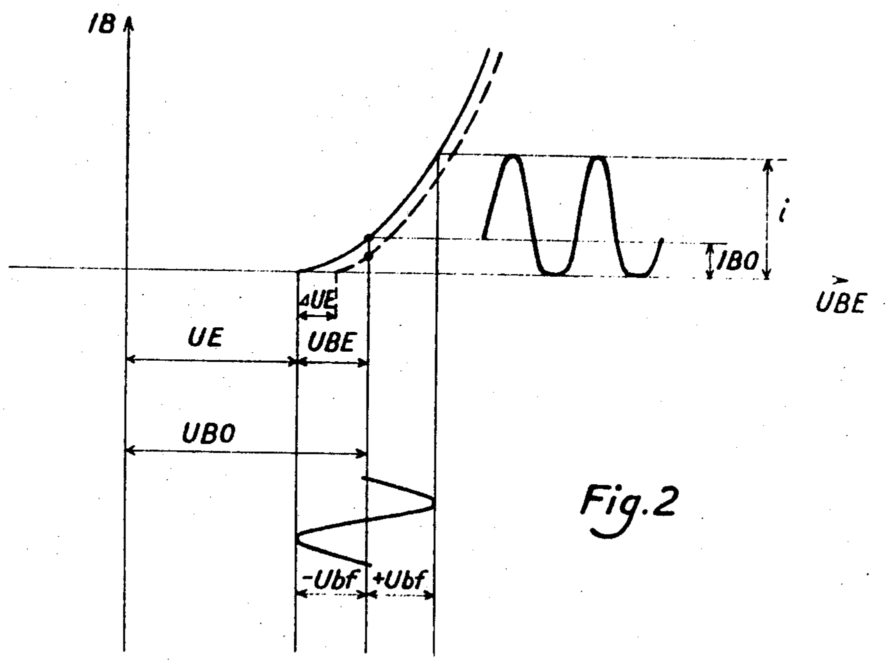

Because of the connection between the voltage divider and the centre tap of the input transformer the bases of the transistors are given a certain bias voltage. This bias is here chosen so that the transistors are to work in class AB-operation. The base is thus biassed with a certain direct voltage UBO. The direct voltage is then set so that a certain quiescent current IBO passes through the transistors. This is shown in FIG. 2 where the base current is drawn as a function of the base emitter voltage. In the figure are also indicated the voltage UE across the resistances R1 and R2, respectively, the voltage UBE between the base and emitter terminals, maximum positive carrier voltage +Ub*f* and maximum negative carrier voltage —Ub*f*, the voltage differences ΔUE across R1 and R2 respectively at varying carrier voltage and also the pulsating base current *i*. From FIG. 2 the following three cases may be distinguished:

(a) *if*/Δ*UE*/</*UBE* a regulating effect will be obtained in the modulator and the output level of the modulator is held at a constant value. The regulation is then carried out as follows. For a sufficiently large carrier voltage a pulsating emitter current *i*E will flow through resistances R1 and R2 respectively due to the rectifying function of the base-emiter diode. This current *i*E, together with an emitter current $IE=hFE \cdot IBO$, delivers through resistances R1 and R2, respectively, the voltage UE. *h*FE then is the DC forward current transfer ratio. If, assuming that the carrier voltage increases, the pulsating emitter current will increase and give a contribution ΔUE to the voltage UE through resistances R1 and R2 respectively. This implies that the voltage UBE decreases because $UBE+UBO$=constant. The quiescent current IBO will decrease and the total emitter current $IE+iE$ and, thus, also the collector current, through the load resistance become constant.

(b) *If*±*Ubf*</*UBE*/, the quiescent point of the base-emitter diode will be located on the curved part of the curve and the modulator will work in class A-operation. The desired frequency components (the sum of or the difference between carrier, and signal voltage) then have so low a voltage compared with the corresponding voltage of a modulator working in class B- or AB-operation that no practical use is found for the same.

(c) When /Δ*UE*/=/*UBE*/ the quiescent $IBO=0$ and the modulator proceeds to work in class B-operation, the regulating effect failing to appear.

An embodiment of the modulator according to the invention intended for practical use is shown in FIG. 3. The modulator comprises besides those components which have been indicated in connection with the description of FIG. 1 a resistance connected amplifier stage connected between the voltage divider and the bases of the transistors T1 and T2. The amplifier stage has an amplification element the transistor T3, the bias voltage of which is regulated by means of the resistances R12 and R13. Across the input 3, 3 of the carrier signal there is connected a resistance R14, by means of which the input impedance of the input 3, 3 can be controlled. In the amplifier stage is also included a filter link consisting of the resistance R15 and the capacitor C3 which are connected between the power supply and ground. To this filter link is connected the voltage divider which here consists of the resistances R9, R10 and R11 and the transistor T3. From the collector of the transistor T3 that voltage will be derived which is supplied to the bases of the transistors T1 and T2 via the centre tap of the secondary winding of the input transformer Tr1. Through the direct voltage supply is furthermore connected a protection circuit for the transistors T1 and T2 which protection circuit comprises the resistances R5, R6 and the capacitor C1.

In order to obtain a constant quiescent current IBO for the transistors T1 and T2 it is possible to use either a resistive voltage divider which is shown on FIG. 1 or an amplifier stage which is shown on FIG. 3. The amplifier stage can besides that one which is shown in FIG. 3 be designed as an emitter follower, i.e. the centre tap of the transformer Tr1 is connected to the emitter of the transistor T3 and the collector of the transistor T3 is connected to ground. Of these two alternatives that which is shown in FIG. 3 is however preferred as this connection will be exceedingly temperature dependent. The temperature dependence of the amplifier transistor T3 has in this connection a temperature compensating effect on the temperature dependence in the modulator transistors T1 and T2. By means of the resistance connected amplifier stage shown in FIG. 3 there is also achieved the object that the carrier effect becomes smaller and a certain possibility is given to vary the impedance in the carrier input within certain limits.

By means of the modulator types described above in accordance with the invention a connection is thus produced in which the output voltage will be independent of variations in the carrier voltage. It has been found that in such connections the output voltage remains unaffected also at so high frequencies as for example 40 kHz.

We claim:

1. A modulator comprising:

first and second transistors, each having base, emitter and collector electrodes;

an input transformer having a primary winding and a centertapped secondary winding, said primary winding being adapted to receive an input modulating signal;

means for connecting the first and second ends of said secondary winding to the base electrodes of said transistors, respectively;

an output transformer having a centertapped primary winding and a secondary winding, said secondary winding being adapted to transmit an output modulated signal;

means for connecting the collector electrodes of said transistor to the first and second ends, respectively, of the primary winding of said output transformer;

a first resistor interconnecting the emitter electrodes of said transistors, said resistor having an intermediate tap;

a source of operating voltage having first and second terminals;

means for connecting the first and second terminals of said source of operating potential to the centertap of the primary winding of said output transformer and the intermediate tap of said first resistor, respectively;

a capacitor and a second resistor, connected in parallel, connecting the centertap of the primary winding of said output transformer to the intermediate tap of said first resistor;

a voltage divider means having an output terminal;

means for connecting said voltage divider means across the terminals of said source of operating potential;

means adapted to apply a carrier signal across one terminal of said source of operating voltage and the centertap of the secondary winding of said input transformer; and means for connecting the output terminal of said voltage divider means to the centertap of the secondary winding of said input transformer whereby said transistors are base biased for class AB operation.

2. The modulator of claim 1 wherein said voltage divider means comprises a third transistor having base, collector and emitter electrodes, first resistor means for connecting the emitter electrode of said third transistor to one terminal of said source of operating voltage, second resistor means for connecting the collector electrode of said third transistor to the other terminal of said source of operating potential, means for establishing an operating bias to the base electrode of said third transistor, means for connecting the collector electrode of said third transistor to the centertap of the secondary winding of said input transformer, and means connected to the base electrode of said third transistor for receiving the carrier signal.

References Cited

UNITED STATES PATENTS

| | | | |
|---|---|---|---|
| 2,521,116 | 9/1950 | Doba. | |
| 3,237,129 | 2/1966 | Allen et al. | |
| 3,239,780 | 3/1966 | Echarti | 332—38 |

ALFRED L. BRODY, Primary Examiner

U.S. Cl. X.R.

307—254; 332—43